Nov. 17, 1942.   P. W. NOSKER ET AL   2,301,967
ACCELERATION PRODUCING MACHINE
Filed Sept. 16, 1941    3 Sheets-Sheet 1
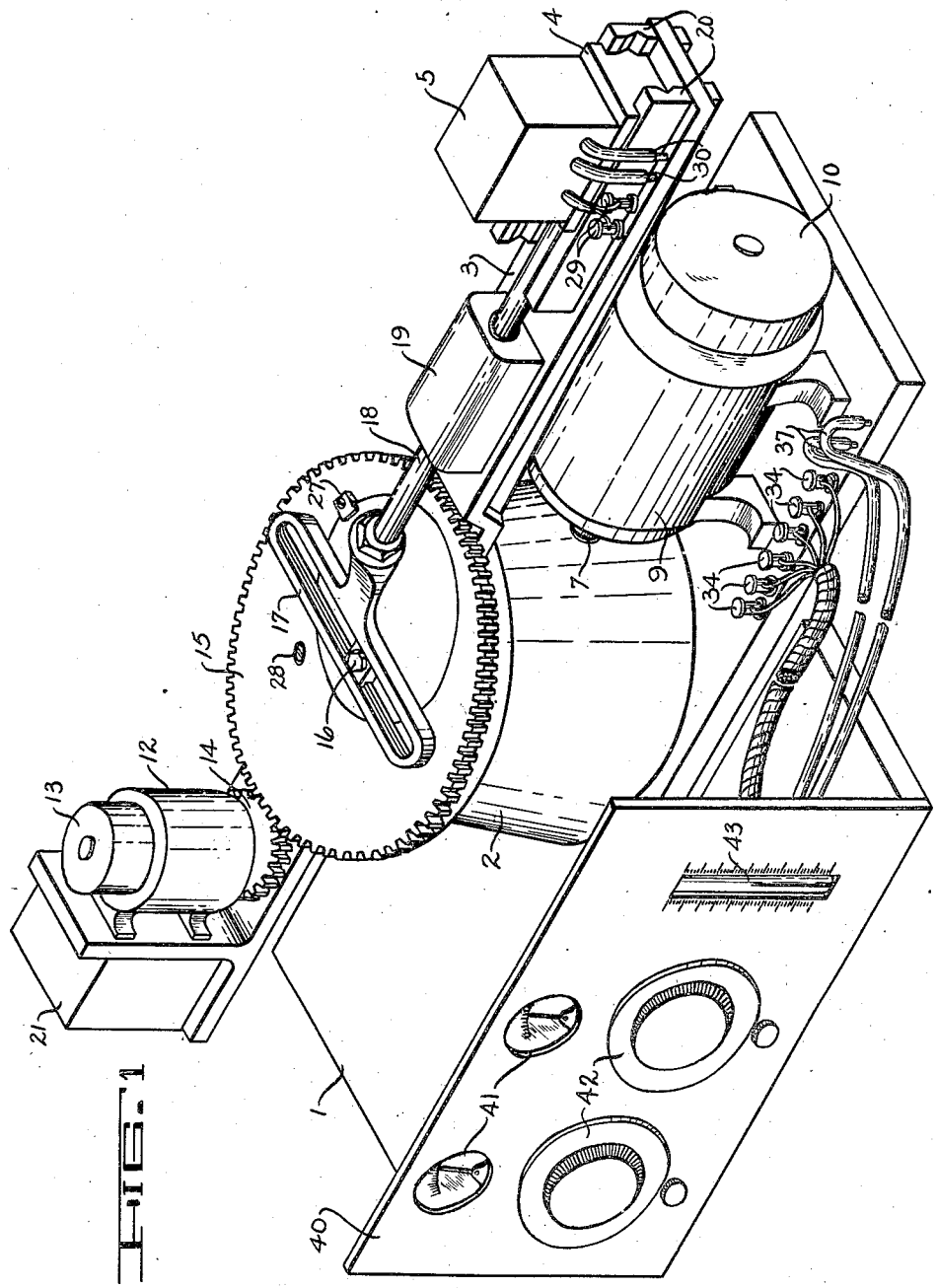
INVENTORS
PAUL W. NOSKER
KARL J. WEIN
BY
ATTORNEYS

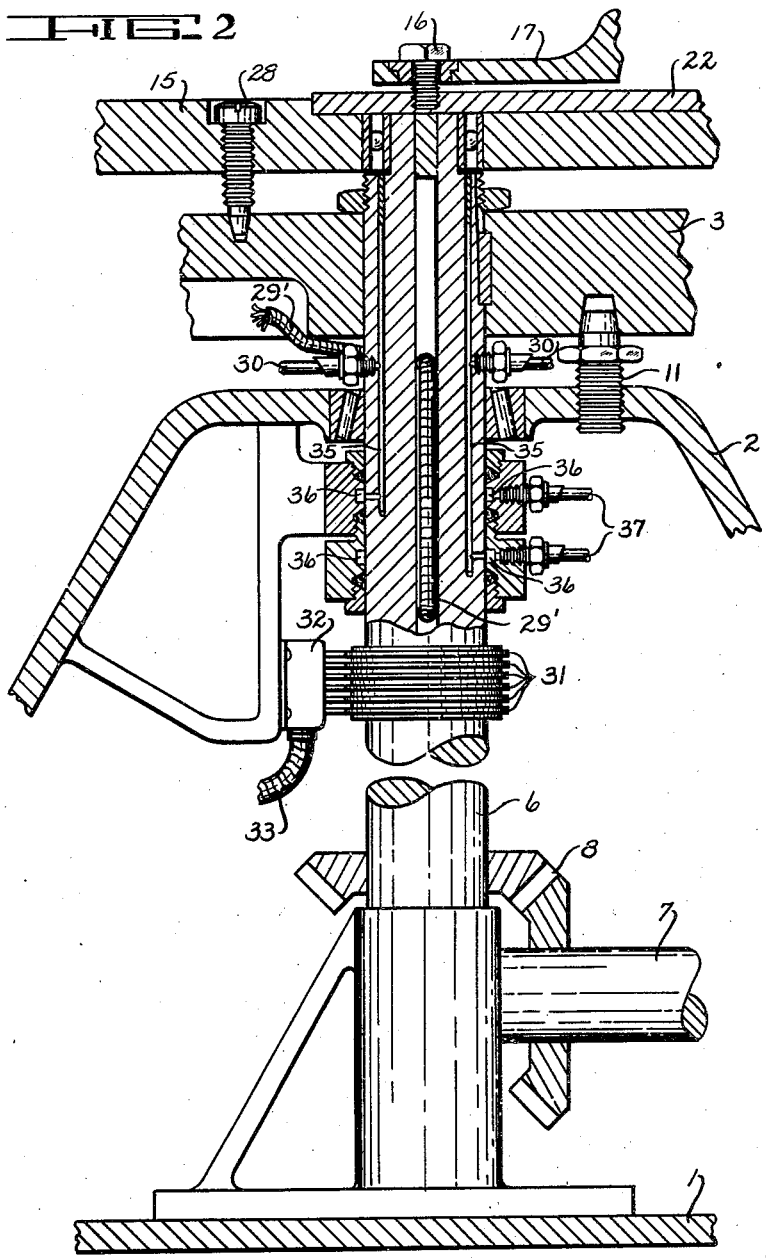

Nov. 17, 1942. P. W. NOSKER ET AL 2,301,967
ACCELERATION PRODUCING MACHINE
Filed Sept. 16, 1941 3 Sheets-Sheet 3
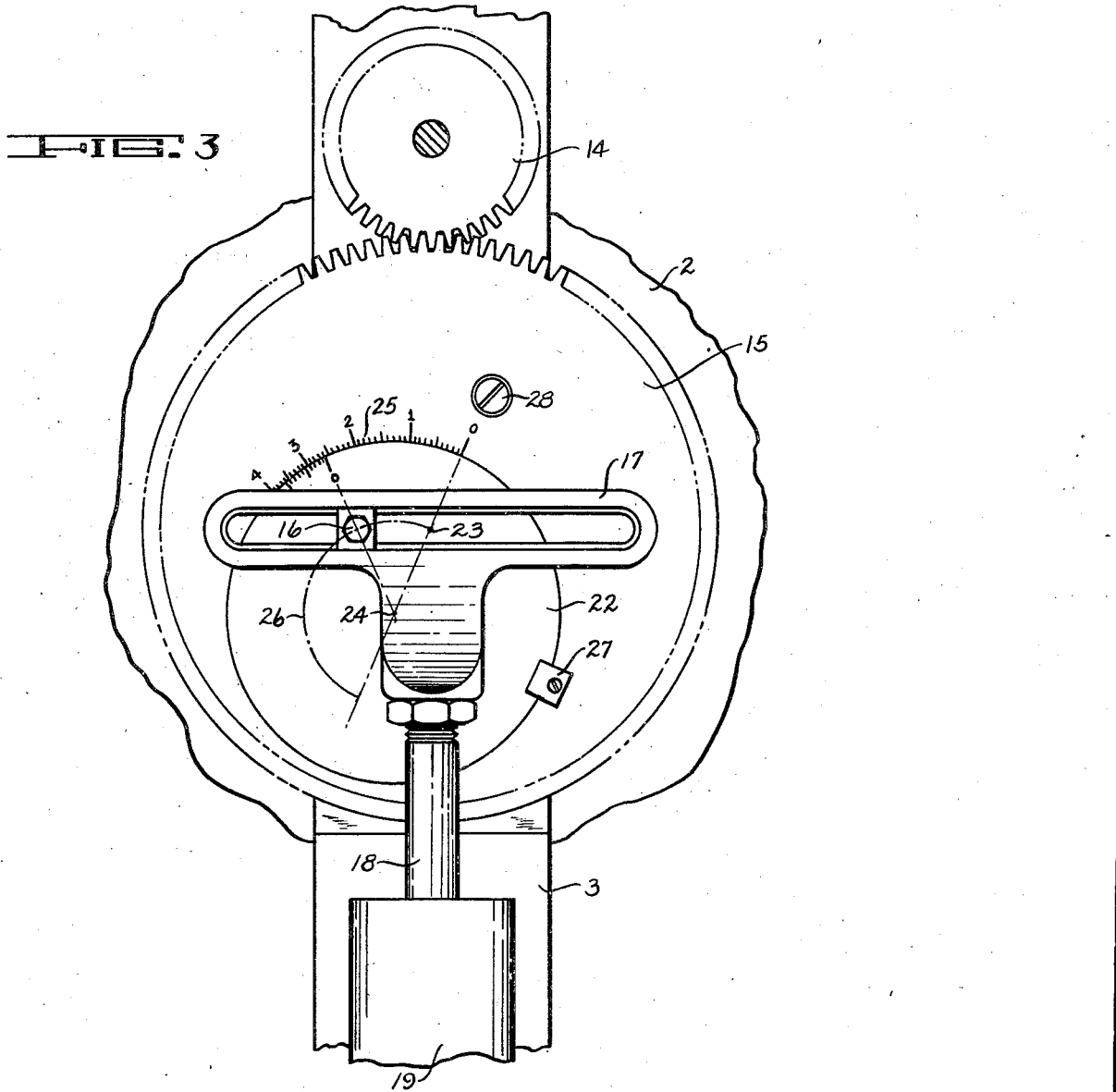

Patented Nov. 17, 1942

2,301,967

UNITED STATES PATENT OFFICE 2,301,967

ACCELERATION PRODUCING MACHINE

Paul W. Nosker, Yellow Springs, and Karl J. Wein, Dayton, Ohio

Application September 16, 1941, Serial No. 411,064

10 Claims. (Cl. 73—151)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to apparatus for producing known or determinable accelerations for test purposes.

An object of the invention is to provide a means for producing constant or static accelerations of controllable and computible magnitudes.

Another object is to provide means for producing varying or dynamic accelerations of controllable and computable magnitudes and frequencies.

A further object is to provide means for producing accelerations having a constant or static component and a superimposed varying or dynamic component, the static component being of controllable and computable magnitude and the dynamic component being of controllable and computable magnitude and frequency.

A further object is to provide a machine capable producing determinable accelerations, for calibrating accelerometers.

A still further object is to provide a machine capable of producing determinable accelerations, for testing the effects thereof on various types of instruments, or other devices of any nature whatsoever within the limitations of the machine.

A still further object is to provide a machine for producing motions of controllable and determinable velocities and amplitudes for calibrating and testing vibration analyzing equipment and the like.

Additional objects and advantages will become apparent to those skilled in the art as the description proceeds in connection with the accompanying drawings in which:

Fig. 1 illustrates a perspective view of a preferred embodiment of an acceleration producing machine constructed according to the principles of the present invention.

Fig. 2 is a fragmentary sectional view showing the manner of mounting the revolving parts, and the manner of making the electrical and air line connections between the base and the revolving parts.

Fig. 3 is a fragmentary top plan view showing the eccentric mechanism in detail.

In the preferred embodiment of the invention herein illustrated, the moving parts of the machine are mounted upon a stationary base 1 and a pedestal 2, and comprise essentially a revolving arm 3 and a reciprocating mounting table 4 for carrying the accelerometer 5, or other device, which is to be calibrated or tested. The revolving arm 3 is keyed to a vertical shaft 6 journaled in the base 1 and pedestal 2, the said shaft being driven by the horizontal motor shaft 7 through bevel gearing or the like, 8. Shaft 7 is turned by the motor 9 which has incorporated therewith a tachometer 10. Locking means 11 are provided for locking the arm 3 against rotation when desired.

The mechanism thus far described will cause movement of the accelerometer 5 in a circular path in a horizontal plane, thereby subjecting it to a constant acceleration due to centripetal force. Additional mechanism will now be described for imparting a reciprocating movement to the accelerometer with respect to the arm 3, thereby to superimpose a variable component of acceleration upon the constant acceleration due to revolution. The motive power for the reciprocating movement is derived from a motor 12 having incorporated therein a tachometer 13. A pinion gear 14 on the motor shaft rotates the flywheel 15 which carries an eccentric pin 16 engaged by the yoke 17 on the reciprocating rod 18. The reciprocating rod 18 runs through a guide bearing 19 and attaches to the mounting table 4 slidable in guides 20. A counterweight 21 may be provided to balance the arm 3.

Means are provided as best shown in Fig. 3 for adjusting the travel of the reciprocating table 4, this means comprising a rotatable plate 22 in the flywheel 15 to which plate the eccentric pin 16 is attached. The numeral 23 indicates the location of the center of the vertical shaft 6, which is the center of rotation of the flywheel 15, and the numeral 24 indicates the center of the circular plate 22. The eccentric pin 16 and the point 23 are arranged to be the same distance from the point 24 so that upon rotation of the plate 22 to the zero position, as indicated by the markings 25, the pin 16 will lie over the center of rotation 23 of the flywheel 15 so as to produce a zero throw in the yoke 17 and reciprocating rod 18. By rotating the plate 22 in a counterclockwise direction, for instance, with respect to the flywheel 15, the eccentric pin 16 will be moved away from the flywheel center 23 to provide a predetermined throw for the yoke 17, and the length of the throw, or a function thereof, may be indicated by a suitable calibration in the scale 25.

In the angular adjustment of the circular plate 22 it will be seen that the pin 16 will move on the arcuate path 26 about the center 24, the maximum possible throw being provided when the pin 16 lies on the opposite side of the center 24 from point 23, and a minimum, or zero, throw being provided as stated when the pin 16 is rotated to a position directly over the point 23. If the scale 25 has uniform graduations the plate 22 is preferably provided with a vernier for accurate positioning. The plate 22 also has associated therewith a suitable clamping means, illustrated generally at 27, for positively securing the circular plate 22 against rotation with respect to the flywheel 15 after a selected adjustment has been made. The clamping means 27 must lie sufficiently close to the top face of the flywheel to clear the under side of the yoke 17. It is understood that in the operation of the device there is intended to be no relative movement between the plate 22 and the flywheel 15, the possibility of movement between these parts being provided solely for the purpose of adjustment before the mechanism is put into operation on a particular test run. In Fig. 2 the plate 22 is adjusted for zero throw, while in Fig. 3 the plate is rotated to produce a certain amplitude of reciprocation, as indicated by the scale 25. It is also desirable to provide some form of locking means such as the machine screw 28 for locking the flywheel 15 against rotation on the arm 3.

With both locking means 11 and 28 effective, as illustrated in Fig. 2, no part of the mechanism can operate. Then, if only the locking means 11 is released, the arm 3 may be caused to revolve at a uniform speed to subject the accelerometer 5 to a constant acceleration. By engaging the locking means 11 and releasing the locking means 28 of the accelerometer 5 may be subjected to a reciprocation in linear simple harmonic motion, thus producing a cyclically varying acceleration. By releasing both locking means 11 and 28 and energizing both motor means 9 and 12, the mounting table 4 carrying the accelerometer 5 will be subjected to an acceleration having a constant component due to the rotation of the arm 3, and a variable component due to reciprocation of the table 4 upon the arm 3 as it revolves. It will be appreciated that if the angular velocity of the arm 3, the frequency of reciprocation of the table 4, and the dimensional constants of the mechanism are known, the acceleration values may be computed for the various types of operation above described.

The illustrated embodiment further comprises means for accurately controlling the speeds of the motors 9 and 12, and means for indicating the several adjustable quantities necessary for the calculations of acceleration values. For this purpose the arm 3 carries electrical binding posts 29 for connection with the acceleration responsive mechanism of the accelerometer 5. Air line connections 30 are also provided for accelerometers designed to take into consideration air speed along with acceleration. The electrical and air line connections at 29, 30 should be provided with sufficient slack to allow for the intended reciprocation of the table 4. The electrical circuit through 29, the power circuit for the motor 12 and the circuit for the tachometer 13 may be brought together in a cable 29' which enters the shaft 6 for connection of the individual circuits with slip rings 31. Individual brushes on a brush holder 32 are provided to complete these circuits and carry them by means of the cable 33 to the various electrical connections 34 on the base 1. The air lines 30 communicate with passages 35 which in turn open into the annular spaces 36 to maintain air pressure connections with the lines 37 as shaft 6 revolves. Suitable packing glands are provided around the shaft to prevent leakage into or out of the spaces 36.

The numeral 40 represents an indicating and control panel carrying a pair of tachometer indicators 41 to accurately show the speeds of motors 9 and 12, and a pair of speed regulating means 42 including a coarse adjustment and a fine adjustment to accurately obtain the desired speed of each motor. Behind the panel 40, appropriate connection is made with a source of power, not shown. The air lines 37 lead to a source of differential air pressure, not shown, designed to simulate the action of an air speed indicator under flight conditions. The gauge 43 indicates the pressure difference existing between the air lines 37 and may be calibrated in appropriate units of pressure or air speed.

The primary advantage of the present acceleration producing machine is that it affords a means for studying the responses of accelerometers and other instruments to static and dynamic accelerations throughout considerable ranges of acceleration amplitude and frequency. The present machine is believed to be the first capable of producing all of the following types of acceleration: constant acceleration, cyclically varying acceleration with no constant component, and cyclically varying acceleration with a constant component. The present mechanism is designed primarily for calibrating accelerometers but is also equally well suited for testing the effects of accelerations of different types upon various other instruments, such as the engine and flying instruments on an airplane, and testing devices which might be applied thereto such as strain gauges and the like. In general, the present mechanism is intended to produce determinable acceleration values in small objects within the capacity of the machine, irrespective of the nature of the objects or the specific purpose to be accomplished. The mechanism is further adapted to produce vibratory motions having controllable and determinable velocities and amplitudes useful in calibrating and testing vibration analyzing equipment and the like.

While we have shown and described but a single embodiment of our invention, it is to be understood that it is capable of many modifications. For instance, provision may be made for accommodating a plurality of accelerometers for simultaneous calibration. This may be done by providing a table 4, capable of holding more than one accelerometer, at the same or different radial distances from the center 23, or a second table 4 may be provided on the other end of the arm 3, in lieu of the counterweight 21. Also, additional arms 3 may be provided, like the spokes of a wheel, and the motor 12 may be mounted between two of these arms, or directly above the center 23. If a plurality of reciprocating tables 4 are provided, they may be all operated from a common eccentric mechanism, or they may be independently reciprocated by individual eccentrics, or cranks, on the same or different motor means. If it is desired to introduce the acceleration of gravity the revolving arm, or arms, may be caused to rotate in an inclined or vertical plane. All such modifications are within the scope of the invention and these and other changes, therefor, in the construction and arrangement may be made which do not depart from the spirit and scope of the invention as defined in the appended claims.

Having now fully described a preferred embodiment of our invention, and the manner in which the same is to be used, what we claim as new and desire to protect by Letters Patent is:

1. An accelerometer calibrator comprising means for subjecting an accelerometer to a constantly acting acceleration in a given direction with respect to said accelerometer, means for superimposing upon said acceleration a varying acceleration in the same plane, and means operable by said two first named means for indicating values determinative of the resultant acceleration experienced by said accelerometer.

2. An acceleration producing machine comprising means for moving an object in a path which is the resultant of two component motions, one of said components being an angular motion in a plane and the other of said components being a reciprocating motion in said plane and in a direction radial to said angular motion, and means operable by said first named means for indicating values determinative of the acceleration experienced by said object.

3. An acceleration producing machine comprising means for supporting an object for angular motion in a plane, controllable speed driving means for said first means, means for measuring the angular velocity of said first means, means carried by said first means for superimposing a reciprocating movement on said object in simple harmonic motion in a direction radial to said angular motion and means for measuring the frequency of said simple harmonic motion.

4. A machine for producing mechanical motions comprising an arm mounted on a vertical axis for rotation in a horizontal plane, a table on said arm adapted to hold a device to be subjected to said motions, controllable speed driving means for imparting an angular velocity to said arm about said axis, means for measuring said angular velocity, controllable speed driving means independent of said first mentioned driving means and carried by said arm for imparting a radial reciprocating movement in simple harmonic motion to said table, means for adjusting the length of stroke of said movement, and means for measuring the frequency of said harmonic motion.

5. A machine for producing mechanical motions comprising an arm mounted on a vertical axis for rotation in a horizontal plane, a table on said arm adapted to hold a device to be subjected to said motions, controllable speed driving means for imparting an angular velocity to said arm about said axis, means for measuring said angular velocity, controllable speed driving means independent of said first mentioned driving means and carried by said arm for imparting a radial reciprocating movement in simple harmonic motion to said table, means for adjusting the length of stroke of said movement, means for measuring the frequency of said harmonic motion, means for locking said table in a fixed position on said arm, and means for locking said arm against rotation.

6. In a machine for subjecting an instrument to mechanical motion, a base, a rotatable arm on said base, means for rotating said arm, a table on said arm adapted to hold said instrument, means for reciprocating said table on said arm, indicator connections on said arm for attachment to said instrument, and means for carrying said connections from said rotatable arm to said base to allow for unlimited rotation of said arm.

7. A testing machine for producing a determinable acceleration which is the resultant of a constant component and at least one variable component which varies sinusoidally with respect to time comprising, a rotatable element, means for driving said element at a constant speed of rotation, a support slidably mounted on said rotatable element and movable radially with respect to the axis of rotation of said rotatable element, and means for causing reciprocation of said support at a predetermined frequency and with a predetermined amplitude.

8. The structure as claimed in claim 7, in which there is provided an adjustable speed driving means for said rotatable element and means for changing the predetermined frequency and amplitude of the reciprocable motion of said support.

9. A testing machine for testing and calibrating acceleration responsive devices and the like comprising, an arm mounted for rotation in a horizontal plane, adjustable speed driving means connected to said arm to cause rotation of the same at a selected speed of rotation, a reciprocable slide mounted on said arm and serving as a support for the device to be tested and movable radially with respect to the axis of rotation of said arm, an adjustable throw crank mounted on said arm, a linkage connecting said crank to said slide effective to cause a simple harmonic reciprocating motion of said slide, and an adjustable speed driving means connected to said crank for driving the same at a selected speed, whereby a device to be tested may be subjected to a constant predetermined accelerating force due to the rotation of said arm and subjected simultaneously to a cyclically varying accelerating force due to reciprocation of said slide.

10. The structure as claimed in claim 9, in which there is provided a speed indicating means operatively associated with the driving means for said arm and a separate speed indicating means operatively associated with the driving means for said crank whereby the angular velocity of the arm and the frequency of the reciprocation of the slide may be determined.

PAUL W. NOSKER.
KARL J. WEIN.